(12) United States Patent
Lilienthal et al.

(10) Patent No.: US 7,089,501 B1
(45) Date of Patent: Aug. 8, 2006

(54) MENU-ASSISTED CONTROL METHOD AND DEVICE

(75) Inventors: Joerg Lilienthal, Gifhorn (DE); Matthias Heimermann, Wolfenbuettel (DE)

(73) Assignee: Volkswagen AG, Wolfsburg (DE)

( * ) Notice: Subject to any disclaimer, the term of this patent is extended or adjusted under 35 U.S.C. 154(b) by 185 days.

(21) Appl. No.: 10/048,608

(22) PCT Filed: Aug. 4, 2000

(86) PCT No.: PCT/EP00/07589

§ 371 (c)(1),
(2), (4) Date: Jun. 10, 2002

(87) PCT Pub. No.: WO01/13211

PCT Pub. Date: Feb. 22, 2001

(30) Foreign Application Priority Data

Aug. 18, 1999 (DE) ................. 199 39 065

(51) Int. Cl.
*G06F 15/00* (2006.01)

(52) U.S. Cl. .............. 715/764; 715/854; 715/743

(58) Field of Classification Search ........ 715/810–812, 715/716–718, 763, 765, 850, 853, 764, 805, 715/743, 751, 854; 340/458–461, 438–439; 307/10.1; 701/1–18, 200, 20–24, 48–49, 701/53, 70, 93
See application file for complete search history.

(56) References Cited

U.S. PATENT DOCUMENTS

| 5,539,429 A | * | 7/1996 | Yano et al. ................. 345/173 |
| 5,555,502 A | * | 9/1996 | Opel ........................... 701/36 |
| 5,736,985 A | | 4/1998 | Lection et al. |
| 5,777,616 A | | 7/1998 | Bates et al. |
| 5,784,059 A | * | 7/1998 | Morimoto et al. .......... 715/854 |
| 5,847,704 A | * | 12/1998 | Hartman ..................... 715/764 |
| 5,874,958 A | * | 2/1999 | Ludolph .................... 715/781 |
| 5,886,697 A | | 3/1999 | Naughton et al. |
| 6,005,299 A | * | 12/1999 | Hengst ....................... 307/10.1 |
| 6,009,355 A | * | 12/1999 | Obradovich et al. .......... 701/1 |

FOREIGN PATENT DOCUMENTS

| DE | 195 31 415 | 2/1997 |
| DE | 195 33 541 | 3/1997 |
| DE | 197 15 325 | 10/1998 |
| EP | 0 701 926 | 3/1996 |
| EP | 0 844 555 | 5/1998 |
| EP | 0 891 066 | 1/1999 |

OTHER PUBLICATIONS

"Selected Object Filter on Pop-Up Menu," IBM Technical Disclosure Bulletin, vol. 39, No. 09, Sep. 1996, pp. 157 to 161.

* cited by examiner

*Primary Examiner*—Cao(Kevin) Nguyen
(74) *Attorney, Agent, or Firm*—Kenyon & Kenyon LLP

(57) ABSTRACT

A method and a device for menu-assisted operator control, in particular for motor vehicles, using a multifunctional operator control, includes a multifunctional display device and a processing device which controls the display build-up of the multifunctional display device and which is able to access electronic devices to be operated and/or controlled. Assisted operator control of the electronic devices is provided in that, at least within one selection menu that is able to be displayed on the multifunctional display device, functions of one or more of the electronic devices are grouped by related objects and are displayed as object icons on the multifunctional display device.

16 Claims, 2 Drawing Sheets

MENU-ASSISTED CONTROL METHOD AND DEVICE

FIELD OF THE INVENTION

The present invention relates to a method and to a device for menu-assisted operator control, in particular for motor vehicles, using a multifunctional operator control, including a multifunctional display device and a processing device which controls the display build-up of the multifunctional display device and which is able to access electronic devices to be operated or controlled and internal and/or external databases.

BACKGROUND INFORMATION

A multifunctional operator control is described, for example, in European Published Patent Application No. 0 701 926. The fundamental principle of this and of other multifunctional operator controls is that the operating functions are subdivided into functional groups (menus), corresponding functions being stored again under a functional group, i.e., the functions are hierarchically organized by function. There are a number of disadvantages associated with such a functional hierarchical organization, particularly when information from various functional groups or functions is needed virtually at the same time. In this context, the multi-tasking from electronic data processing technology is not suited for motor vehicle applications, since it is, to some extent, very diversified, depending on the display, and it distracts the driver of the vehicle from the traffic.

It is an object of the present invention, therefore, to provide a method and a device for menu-assisted operator control, which will render possible a simplified user interface for utilizing various functions and/or electronic devices.

SUMMARY

The above and other beneficial objects of the present invention are achieved by providing a method and a device as described herein.

In this context, the present invention is directed to grouping functions on the basis of related objects and undertaking an object-oriented subdivision, all relevant functions and/or electronic devices being directly addressable from one object level. In so doing, one utilizes the realization that human actions are more object-oriented than function-oriented. A further realization is that most multifunctional wishes are related to one common object. The concept of an "object" includes individual persons, buildings, radio and television stations, restaurants, shows, institutions or other object-related concepts which are offered to the user as object icons. Provided underneath the object icons, if indicated, are object-specific functions including the object-oriented data, which then are optionally selectable. These may activate a navigational system or a call, for example, select a transmitter or send an e-mail.

The object icons may be configured alphanumerically and/or as pictograms, these being able to be grouped, for example, into lists.

In accordance with one example embodiment of the present invention, the object icons are displayed on the multifunctional display device in dependence upon the user. In this case, at least one selection menu, including its requested or selected object icons, is available to different users.

Another variant provides for displaying the object icons as a function of an operator history on the multifunctional display device. For example, if one object has been repeatedly invoked or navigation to the object has been initiated, an object icon is generated on the multifunctional display device in a selection menu for this object.

In the same manner, functions may be assigned to an object icon. Moreover, provision may be made for the functions to be assigned to a specific object as a function of the type of object. For example, if navigation to the object is possible, then this function is automatically assigned to this object.

One example embodiment of the present invention provides for object icons to be erasable by the user or the system and/or new object icons to be able to be added. In accordance with another example embodiment of the present invention, the functions assigned to the object icons may also be erased by the user or the system and/or new functions may be added to the object.

Since too large a number of displayed object icons within a selection menu clutters the multifunctional display device, the object icons may be organized in subgroups, which are selectable through a higher-level selection menu. Examples of such subdivisions may include "business" and "private". Also possible are subdivisions such as "restaurant" or "audio and video transmitter".

The present invention is described below on the basis of an example embodiment.

DETAILED DESCRIPTION

Figure 1:
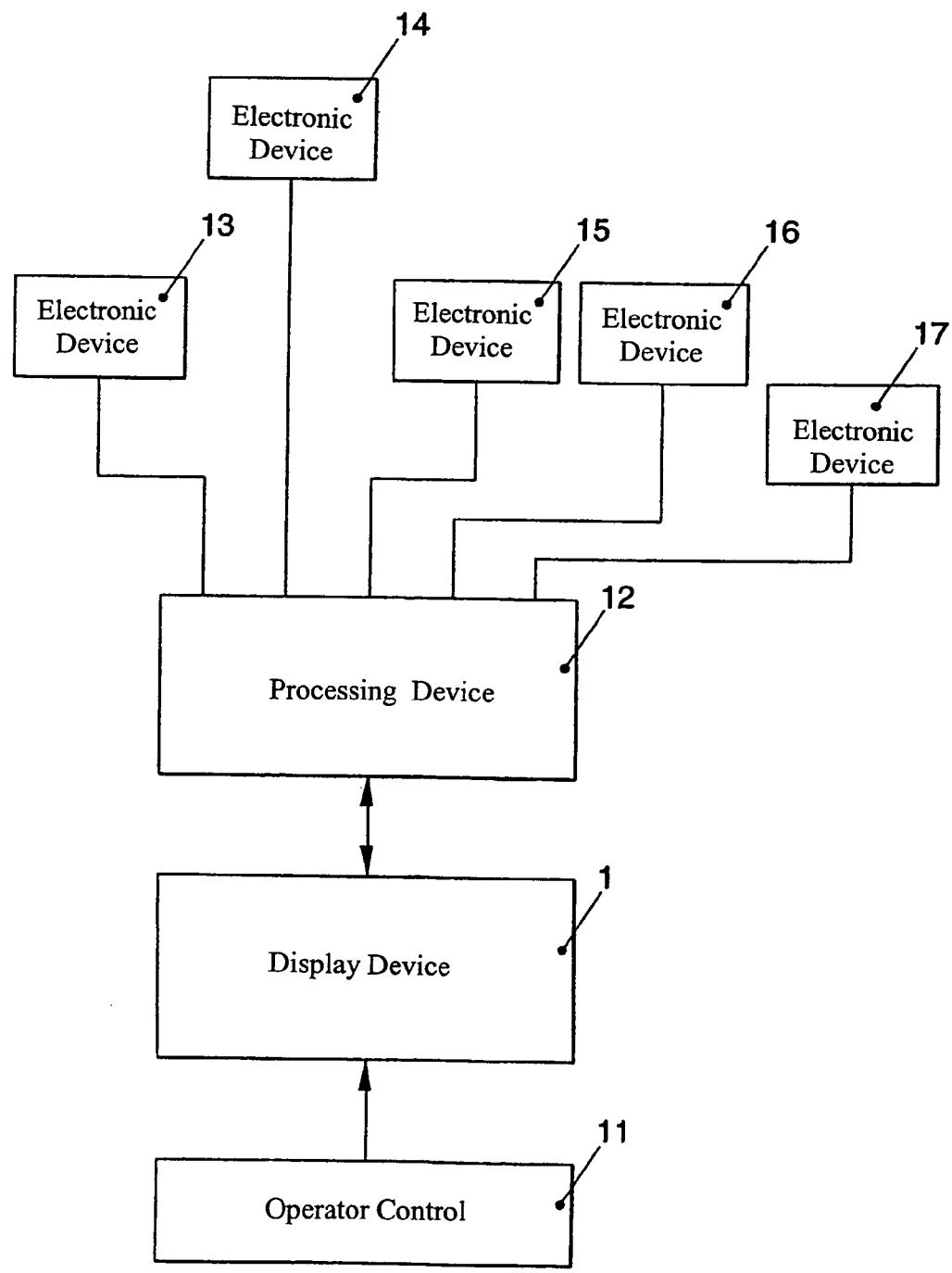
FIG. 1 is a schematic view of a multifunctional operator control.

FIG. 1 illustrates a multifunctional operator control which may be configured in a motor vehicle, for example, in the instrument panel. In this context, the multifunctional operator control includes a multifunctional display device 1, which is linked to an operator control 11 and to a processing device 12 which controls the display build-up of the multifunctional display device. Moreover, processing device 12 accesses a number of electronic devices 13 to 17, which are to be operated and controlled via operator control 11 and which may be, for example, a navigational device, a mobile phone, an Internet connection, etc., and routes the operating and control commands input via operator control 11 to the corresponding electronic devices 13 to 17, which execute these commands.

Figure 2:
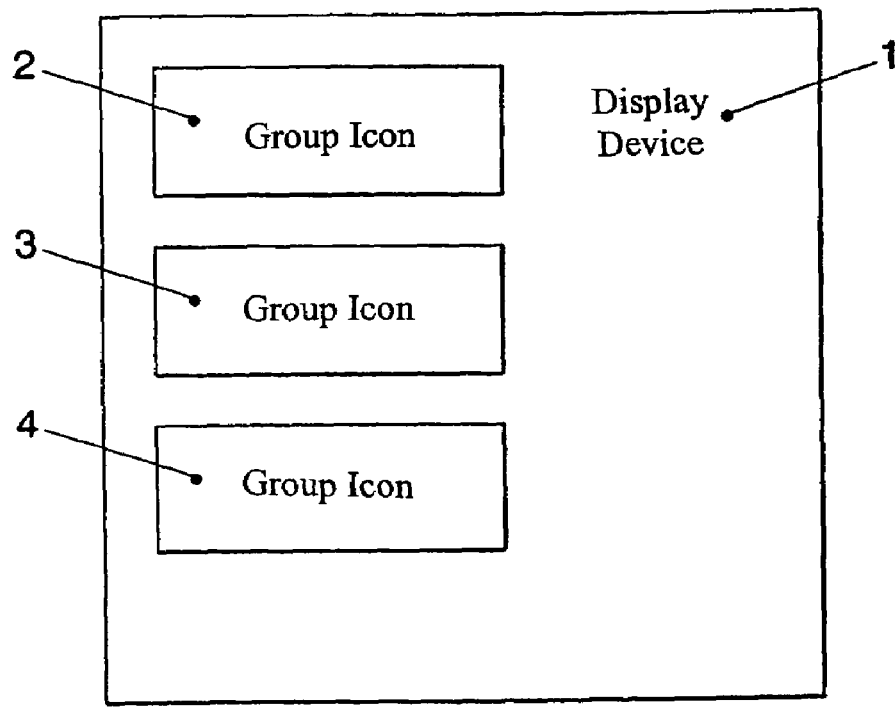
FIG. 2 is a schematic view of groups on a multifunctional display device.
Figure 3:
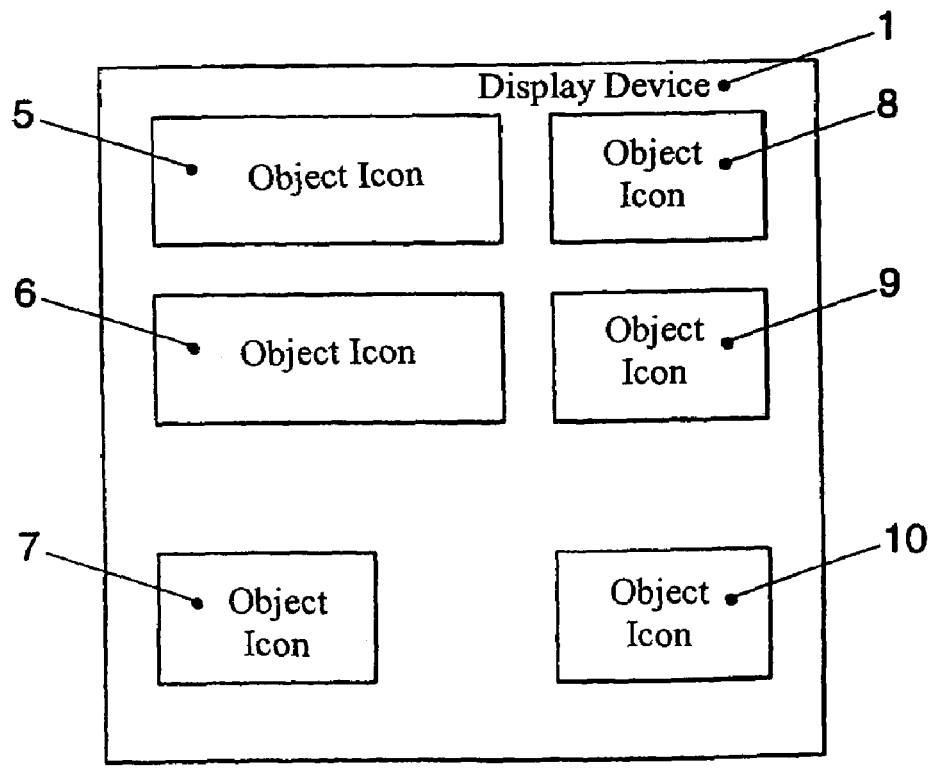
FIG. 3 is a schematic view of objects on a multifunctional display device.

To facilitate a simplified and more straightforward operation of electronic devices 13 to 17, on multifunctional display device 1, at least one selection menu is provided, the individual operator and control functions of which are not arranged in accordance with electronic devices 13 to 17, but rather are oriented by objects. FIGS. 2 and 3 illustrate one possible example of an object-oriented display.

In FIG. 2, a number of groups is illustrated on a multifunctional display device 1 using group icons 2 to 4. The groups are used to subdivide objects. Moreover, depending on the number of available objects, at least one further subdivision of the groups may also be provided. In the illustrated example, for example, "business" and "private"

may be provided as higher-level groups, the group "private" including the subgroups "sport", "family" and "other". Corresponding objects are assigned to the subgroups, in FIG. 3, corresponding objects of the subgroup "family" being displayed as object icons 5 to 10. All object-oriented data and operator control options for the object are accessible under object icon 5 to 10 in question. This is clarified in greater detail based on the example of "Uncle Otto" for object 5. First, the object "Uncle Otto" is selected by the user. This is done, for example, by selecting object icon 5 via operator control 11. The object may optionally be selected by an appropriate voice command, as well. Stored under object icon 5 are, for example, the call number, the address, the e-mail address, other existing personal data, etc. In this context, in the business area, order numbers, sales, supplier profiles, the most recently shared telephone call, etc., may also be assigned to individual objects. The object-oriented data may be displayed alphanumerically on multifunctional display unit 1 and/or be contained as hidden data in the functions. Thus, for example, a telephone receiver, which constitutes the "telephone" function, may be displayed pictographically. If, at this point, this function is selected, then Uncle Otto's phone number is automatically dialed by mobile phone 16. The equivalent holds true for the address with respect to navigation using a navigational system 13, or the e-mail address to send an e-mail using device 14. In this manner, the user is able to perform various functions on the basis of related objects, from one level. If the image stores are configured appropriately, images of the objects may also be displayed.

What is claimed is:

1. A method for menu-assisted operator control using a multifunctional operator control, including a multifunctional display device, comprising the steps of:
controlling a display build-up of the multifunctional display device by a processing device;
accessing by the processing device electronic devices to be one of operated and controlled;
grouping functions of at least one of the electronic device at least within one selection menu by related electronic-device-independent objects; and
displaying the functions of the at least one of the electronic devices as electronic-device-independent object icons on the multifunctional display device.

2. The method according to claim 1, wherein the menu-assisted operator control is configured for a motor vehicle.

3. The method according to claim 1, further comprising the step of assigning the functions to the object icons on the basis of related objects.

4. The method according to claim 1, wherein the object icons are displayed on the multifunctional display device in the displaying step at least one of in user-independent fashion and as a function of an operator history.

5. The method according to claim 1, further comprising the step of assigning the functions to the object icons at least one of in user-dependent fashion, as a function of an operator history and as a function of a type of object.

6. The method according to claim 1, wherein the object icons displayed on the multifunctional display device in the displaying step are at least one of erasable and addable as new object icons.

7. The method according to claim 1, further comprising the step of assigning a function to an object icon at least one of erasably and addably as a new function.

8. The method according to claim 1, further comprising the step of subdividing the functions displayed by the object icons into groups, the groups configured as higher-level group icons.

9. A device for menu-assisted operator control using a multifunctional operator control, comprising:
a multifunctional display device;
a processing device configured to control a display build-up of the multifunctional display device and configured to access electronic devices to be at least one of operated and controlled; and
an arrangement configured to group functions of at least one of the electronic devices by related electronic-device-independent objects at least within one selection menu, the multifunctional display device configured to display as electronic-device-independent object icons representing one menu option the functions of the at least one of the electronic devices.

10. The device according to claim 9, further comprising a motor vehicle.

11. The device according to claim 9, wherein the multifunctional display device is configured to display the object icons representing one menu option at least one of in user-independent fashion and as a function of an operator history.

12. The device according to claim 9, further comprising an arrangement configured to assign the functions to the object icon at least one of in user-dependent fashion, as a function of an operator history and as a function of a type of object.

13. The device according to claim 9, wherein the object icons displayed on the multifunctional display device are at least one of erasable and addable as new object icons.

14. The device according to claim 9, further comprising an arrangement configured to assign a function to an object icon at least one of erasably and addably as a new function.

15. The device according to claim 9, wherein at least one of the object icons and functions assigned to the object icons are configured at least one of alphanumerically and as a pictogram.

16. The device according to claim 9, further comprising an arrangement configured to combine functions displayed by the object icons into groups, the groups configured as higher-level group icons.

* * * * *